(12) United States Patent
Shoji et al.

(10) Patent No.: US 8,125,675 B2
(45) Date of Patent: Feb. 28, 2012

(54) LABELING METHOD, RECORDING METHOD, LABELING APPARATUS, RECORDING APPARATUS AND RECORDING MEDIUM

(75) Inventors: Mamoru Shoji, Osaka (JP); Toyoji Gushima, Osaka (JP); Akira Muto, Osaka (JP); Takeshi Nakajima, Nara (JP)

(73) Assignee: Panasonic Corporation, Osaka (JP)

(*) Notice: Subject to any disclaimer, the term of this patent is extended or adjusted under 35 U.S.C. 154(b) by 1280 days.

(21) Appl. No.: 11/794,229

(22) PCT Filed: Dec. 16, 2005

(86) PCT No.: PCT/JP2005/023149
§ 371 (c)(1),
(2), (4) Date: Jun. 27, 2007

(87) PCT Pub. No.: WO2006/070622
PCT Pub. Date: Jul. 6, 2006

(65) Prior Publication Data
US 2008/0152412 A1 Jun. 26, 2008

(30) Foreign Application Priority Data
Dec. 28, 2004 (JP) ................. 2004-379336

(51) Int. Cl.
*G06F 15/00* (2006.01)
*B41J 2/435* (2006.01)
(52) U.S. Cl. .................... 358/1.18; 347/224
(58) Field of Classification Search ............ 358/1.18, 358/1.15, 1.12; 347/247, 224, 9, 11; 206/232, 206/308.1, 460; 369/48, 47.55, 53.2, 47.27, 369/53.1
See application file for complete search history.

(56) References Cited

U.S. PATENT DOCUMENTS

| 6,532,034 B2 | 3/2003 | Hirotsune et al. |
| 2004/0120236 A1 | 6/2004 | Suzuki et al. |
| 2005/0046692 A1* | 3/2005 | Bronson ............. 347/224 |
| 2005/0169115 A1 | 8/2005 | Nagano et al. |

FOREIGN PATENT DOCUMENTS

| JP | 64-30026 | 1/1989 |
| JP | 2001-202565 | 7/2001 |
| JP | 2001-222876 | 8/2001 |
| JP | 2002-216396 | 8/2002 |
| JP | 2002-219873 | 8/2002 |
| JP | 2002-251862 | 9/2002 |
| JP | 2002-292939 | 10/2002 |
| JP | 2003-15924 | 1/2003 |
| JP | 2003-19828 | 1/2003 |
| JP | 2003-173541 | 6/2003 |
| JP | 2003-316533 | 11/2003 |
| JP | 2003-341147 | 12/2003 |
| JP | 2004-158135 | 6/2004 |
| JP | 2004-192735 | 7/2004 |
| JP | 3577005 | 7/2004 |
| JP | 2005-182859 | 7/2005 |

* cited by examiner

*Primary Examiner* — Saeid Ebrahimi Dehkordy
(74) *Attorney, Agent, or Firm* — Wenderoth, Lind & Ponack, L.L.P.

(57) ABSTRACT

A recording/reproducing apparatus performs labeling that matches the information recorded on a recording medium. The recording/reproducing apparatus labels the content stored on a recording medium, and includes a control unit that acquires label information for labeling the content. A printing unit labels the label information on the recording medium.

46 Claims, 5 Drawing Sheets

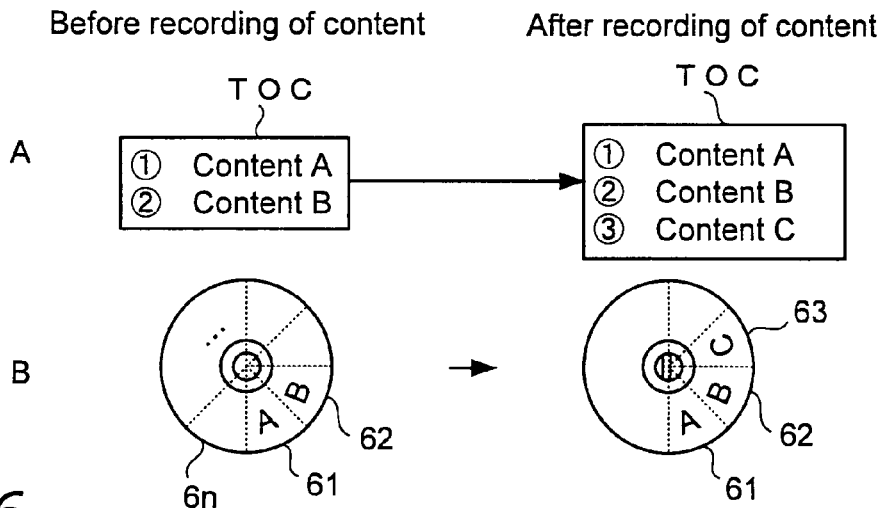
Fig. 6
Fig. 7
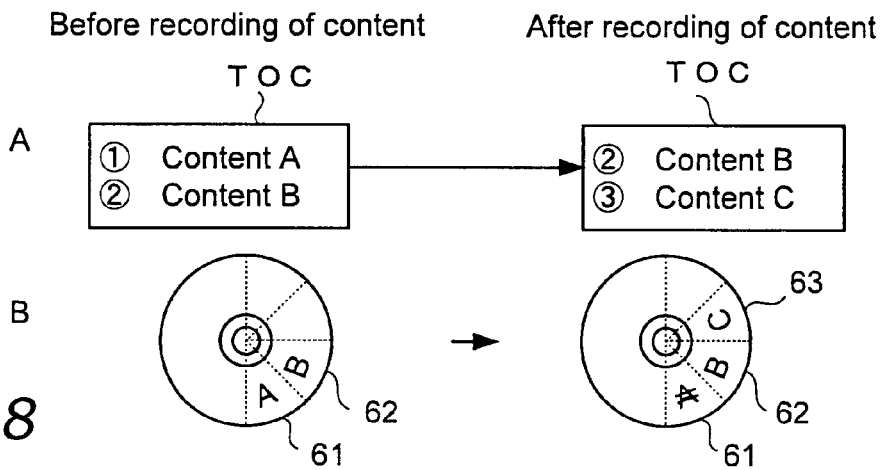
Fig. 8

LABELING METHOD, RECORDING METHOD, LABELING APPARATUS, RECORDING APPARATUS AND RECORDING MEDIUM

BACKGROUND OF THE INVENTION

1. Technical Field

The present invention relates to an labeling method, a recording method, an labeling apparatus, a recording apparatus and a recording medium, and more particularly to an labeling method and an labeling apparatus that label information stored on a recording medium on the recording medium, a recording method and a recording apparatus that record label information for labeling information stored on a recording medium on the recording medium, and a recording medium on which information stored therein is indicated.

2. Background Art

An environment has been set up in recent years in which recording using recording media such as CDs and DVDs is easily carried out. For example, recording of multimedia using such recording media is commonly carried out.

Under the circumstances, users label information, which is recorded on a recording medium, on the recording medium so that they can identify the information recorded on the recording medium at a glance.

For example, users attach a handwritten label onto a recording medium. Alternatively, they print out a label based on manually input information to attach the label onto a recording medium. Techniques are known for printers that perform the label printing as described above (see, for example, Patent Document 1).

As another technique for labeling recorded information, it is also known to write characters and graphics in an information recording surface so as to be visible (see, for example, Patent Document 2).

Patent Document 1: JP 2003-19828A
Patent Document 2: Japanese Patent No. 3577005

However, according to the above-described techniques, the information labeled on a recording medium may not sometimes match the information actually recorded on the recording medium. For example, a case may occur in which the information recorded on a recording medium is updated, but the label is not updated along with the update of information. This discrepancy complicates the management of the recording medium and the like.

In view of the above, the present invention can solve the problem by performing labeling that matches the information recorded on a recording medium.

SUMMARY OF THE INVENTION

A labeling method according to an embodiment is a method for labeling information on a recording medium, the information being adapted to be stored on the recording medium (hereinafter referred to as "storage information"), and includes a labeling information acquiring step and a labeling step. The labeling information acquiring step is to acquire labeling information for indicating the storage information, the labeling information corresponding to the storage information. The labeling step is to label the labeling information on the recording medium.

As used herein, the "information being adapted to be stored on the recording medium" refers not only to information that is already stored on the recording medium, but also refers to information that is being stored on the recording medium or information before being stored on the recording medium (this applies hereinafter).

Also, "label" and "labeling" mean to label the labeling information on a surface (label surface) opposite to an information recording surface of the recording medium by means of printing or other methods, or to label the labeling information on the information recording surface so as to be visible (this applies hereinafter).

Also, the "storage information" may include a so-called "content" such as multimedia information or management information thereof (this applies hereinafter).

The "labeling information" may include an image itself that is labeled on the recording medium or character or image information that represents the storage information. When the labeling information is character or image information that represents the storage information, it may further include information that represents the labeling position of the character or image information on the recording medium (this applies hereinafter). In this case, the labeling information may be, for example, data for generating a print image expressed in a language called page description language.

According to the labeling method of the present invention, the labeling information that corresponds to the storage information is indicated on the recording medium. Therefore, the storage information adapted to be stored on the recording medium and the labeling information can be matched.

A labeling method according to an embodiment is a labeling method, wherein the labeling step is a step of printing the labeling information on the recording medium.

According to the labeling method of the present invention, the labeling information is printed on the recording medium. Therefore, the storage information stored on the recording medium and the printed labeling information can be matched.

A labeling method according to an embodiment is a labeling method, wherein the labeling information acquiring step is a step of generating the labeling information based on the storage information.

According to the labeling method of the present invention, the labeling information is generated based on the storage information. Therefore, the labeling information and the storage information can be matched.

A labeling method according to an embodiment is a labeling method, which further includes a storage information acquiring step of acquiring the storage information stored on the recording medium or the storage information before being stored on the recording medium. The labeling information acquiring step is a step of generating the labeling information based on the acquired storage information.

According to the labeling method of the present invention, the labeling information is generated based on the storage information that is being stored on the recording medium or the storage information before being stored on the recording medium. Therefore, it is possible to indicate the labeling information that corresponds to the storage information while recording the storage information on the recording medium.

A labeling method according to an embodiment is a labeling method, which further includes a reproducing step of reproducing the storage information that is already stored on the recording medium. The labeling information acquiring step is a step of generating the labeling information based on the reproduced storage information.

According to the labeling method of the present invention, the labeling information is generated based on the reproduced storage information. Therefore, it is possible to indicate the labeling information that matches the storage information stored on the recording medium.

A recording method according to an embodiment is a method for recording labeling information on a recording medium, the information being adapted to be stored on the recording medium (hereinafter referred to as "storage information"), and includes a labeling information acquiring step and a recording step. The labeling information acquiring step is to acquire the labeling information that corresponds to the storage information. The recording step is to record the labeling information so as to correspond to the recording medium.

According to the recording method of the present invention, the labeling information that corresponds to the storage information is acquired, and the labeling information is recorded so as to correspond to the recording medium. Therefore, for example, when the labeling information is indicated on the recording medium, it is possible to utilize the labeling information that matches the storage information stored on the recording medium.

A recording method according to an embodiment is a recording method, wherein the labeling information is information for printing the storage information on the recording medium.

According to the recording method of the present invention, for example, it is possible to print the labeling information that matches the storage information stored on the recording medium.

A recording method according to an embodiment is a recording method, wherein the recording step is a step of recording the labeling information on an information recording surface of the recording medium.

According to the recording method of the present invention, the labeling information is related to the recording medium by recording the labeling information on an information recording surface of the recording medium. Therefore, it is possible to utilize the labeling information that matches the storage information stored on the recording medium.

A recording method according to an embodiment is a recording method, wherein the recording step is a step of recording the labeling information together with information for specifying the recording medium.

As used herein, the "information for specifying the recording medium" means, for example, a disk ID given to each recording medium and the like.

According to the recording method of the present invention, the labeling information is related to the recording medium by recording the labeling information together with the information for specifying the recording medium. Therefore, it is possible to utilize the labeling information that matches the storage information stored on the recording medium.

A recording method according to an embodiment is a recording method, wherein the labeling information recorded in the recording step is changeable according to a change in the storage information.

According to the recording method of the present invention, for example, even when the storage information is changed, it is possible to utilize the labeling information that matches the storage information stored on the recording medium.

A labeling apparatus according to an embodiment is an apparatus that labels information on a recording medium, the information being adapted to be stored on the recording medium (hereinafter referred to as "storage information"), and includes a labeling information acquiring unit and a labeling unit. The labeling information acquiring unit is to acquire labeling information for indicating the storage information. The labeling unit is to label the labeling information on the recording medium.

As used herein, the "information being adapted to be stored on the recording medium" refers not only to information that is already stored on the recording medium, but also refers to information that is being stored on the recording medium or information before being stored on the recording medium.

"label" and "labeling" mean to label the labeling information on a surface (label surface) opposite to an information recording surface of the recording medium by means of printing or other methods, or to label the labeling information on the information recording surface.

As used herein, the "storage information" may include a so-called "content" such as multimedia information or management information thereof.

Because the labeling information for indicating the storage information is labeled on the recording medium, the labeling information and the storage information stored on the recording medium can be matched.

A labeling apparatus according to an embodiment is a labeling apparatus, wherein the labeling unit is a unit for printing the labeling information on the recording medium.

According to the labeling apparatus of the present invention, the labeling information is printed on the recording medium. Therefore, the printed labeling information and the storage information adapted to be stored on the recording medium can be matched.

A labeling apparatus according to an embodiment is a labeling apparatus, wherein the labeling information acquiring unit is a unit for generating the labeling information based on the storage information.

According to the labeling apparatus of the present invention, the labeling information is generated based on the storage information. Therefore, the labeling information and the storage information can be matched.

A labeling apparatus according to an embodiment is a labeling apparatus, which further includes a storage information acquiring unit for acquiring the storage information that is being stored on the recording medium or the storage information before being stored on the recording medium. The labeling information acquiring unit is a unit for generating the labeling information based on the acquired storage information.

According to the labeling apparatus of the present invention, the labeling information is generated based on the storage information that is being stored on the recording medium or the storage information before being stored on the recording medium. Therefore, for example, it is possible to indicate the labeling information that corresponds to the storage information on the recording medium while recording the storage information onto the recording medium.

A labeling apparatus according to an embodiment is a labeling apparatus, which further includes a reproducing unit for reproducing the storage information that is already stored on the recording medium. The labeling information acquiring unit is a unit for generating the labeling information based on the reproduced storage information.

According to the labeling apparatus of the present invention, the labeling information is generated based on the reproduced storage information. Therefore, it is possible to indicate the labeling information that matches the storage information stored on the recording medium.

A recording apparatus according to an embodiment is an apparatus that records labeling information for indicating information on a recording medium, the information being adapted to be stored on the recording medium (hereinafter referred to as "storage information"), and includes a labeling information acquiring unit and a recording unit. The labeling information acquiring unit is to acquire the labeling information. The recording unit is to record the labeling information so as to correspond to the recording medium.

According to the recording apparatus of the present invention, the labeling information that corresponds to the storage information is acquired, and the labeling information is recorded so as to correspond to the recording medium. Therefore, for example, when the labeling information is labeled on the recording medium, it is possible to utilize the labeling information that matches the storage information stored on the recording medium.

A recording apparatus according to an embodiment is a recording apparatus, wherein the labeling information is information for printing the storage information on the recording medium.

According to the recording apparatus of the present invention, for example, it is possible to print the labeling information that matches the storage information stored on the recording medium.

A recording apparatus according to an embodiment is a recording apparatus, wherein the recording unit is a unit for recording the labeling information on an information recording surface of the recording medium.

According to the recording apparatus of the present invention, the labeling information is related to the recording medium by recording the labeling information on an information recording surface of the recording medium. Therefore, it is possible to utilize the labeling information that matches the storage information stored on the recording medium.

A recording apparatus according to an embodiment is a recording apparatus, wherein the recording unit is a unit for recording the labeling information together with information for specifying the recording medium.

As used herein, the "information for specifying the recording medium" means, for example, a disk ID given to each recording medium.

According to the recording apparatus of the present invention, the labeling information is related to the recording medium by recording the labeling information together with the information for specifying the recording medium. Therefore, it is possible to utilize the labeling information that matches the storage information stored on the recording medium.

A recording apparatus according to an embodiment is a recording apparatus, wherein the labeling information recorded by the recording unit is changeable according to a change in the storage information.

According to the recording apparatus of the present invention, for example, even when the storage information is changed, it is possible to utilize the labeling information that matches the storage information stored on the recording medium.

A recording medium according to an embodiment is a recording medium on which information stored therein (hereinafter referred to as "storage information") is labeled, and in which the storage information and labeling information for indicating the storage information are recorded.

According to the recording medium of the present invention, it is possible to utilize the labeling information that matches the storage information.

A recording medium according to an embodiment is a recording medium, wherein the labeling information is changeable according to a change in the storage information.

According to the recording medium of the present invention, even when the storage information is changed, it is possible to utilize the labeling information that matches the storage information stored on the recording medium.

According to the present invention, it is possible to perform labeling that matches the information recorded on a recording medium.

BRIEF DESCRIPTION OF DRAWINGS

FIG. 6 it is a diagram used to explain a label printing function according to a modified example.

FIG. 7 it is a diagram used to explain label information

FIG. 8 it is a diagram used to explain a label printing function according to a modified example.

DESCRIPTION OF REFERENCE NUMERALS

Figure 1:
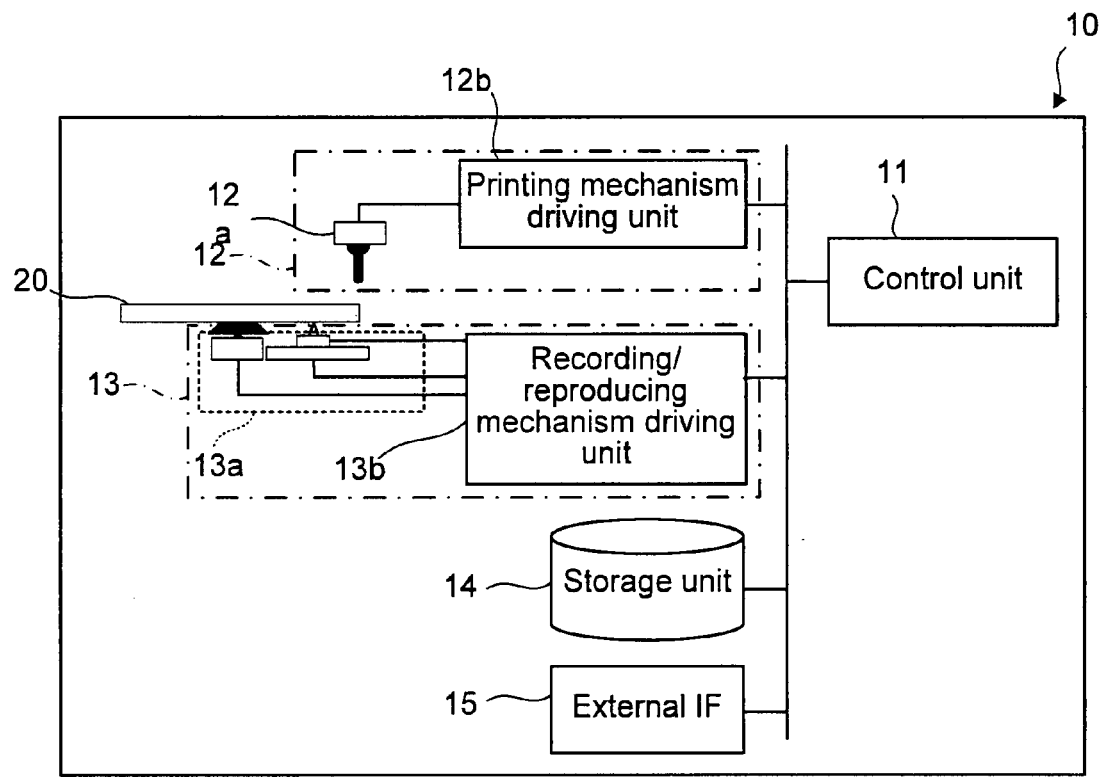
FIG. 1 it is a structure diagram illustrating a configuration of a recording/reproducing apparatus.

10 Recording/reproducing apparatus
11 Control unit
12 Printing unit
12a Printing mechanism
12b Printing mechanism driving unit
13 Recording/reproducing unit
13a Recording/reproducing mechanism
13b Recording/reproducing mechanism driving unit
14 Storage unit
15 External interface
20 Recording medium
61 First region
62 Second region
63 Third region

DETAILED DESCRIPTION OF THE INVENTION

Hereinafter, as an embodiment of the present invention, a label printing apparatus that prints a label for a recording medium will be described. The label printing apparatus is an apparatus that prints a label that indicates information (hereinafter referred to as a "content") recorded on a disk-shaped recording medium such as a CD or DVD on a label surface, which is opposite to a information recording surface, of the recording medium.

The label printing apparatus of the present invention is characterized by having the following features: (1) a function of generating label information for printing a label from a content or the management information of the content when the content is recorded onto a recording medium (label information generating function); (2) a function of printing a label using the generated or recorded label information (label printing function); and (3) a function of recording the label information for label printing into the recording medium or a storage unit of the label printing apparatus (label information recording function).

The label printing apparatus may be used alone as a printing apparatus, or may be incorporated in an apparatus that records and reproduces information into and from a recording medium such as a CD or DVD. Hereinafter, a description is given of a label printing apparatus that can be incorporated in a recording/reproducing apparatus for recording media.

<Configuration>

FIG. 1 shows a recording/reproducing apparatus 10 according to Embodiment 1 of the present invention. The recording/reproducing apparatus 10 is an apparatus that records and reproduces multimedia information such as videos and sounds into and from a recording medium 20 such as a CD or DVD. The recording/reproducing apparatus 10 mainly includes a control unit 11 that controls the entire apparatus, a printing unit 12 that prints a label on the recording medium 20, a recording/reproducing unit 13 that records and reproduces information into and from the recording medium 20, a storage unit 14 that includes, for example, a hard disk, an external interface (IF) 15 that acquires multimedia information or management information thereof from an external source.

The control unit 11 is a device that includes, for example, a semiconductor chip called a "microprocessor" and executes programs stored in a memory, which is not shown in FIG. 1, (e.g., a RAM, ROM, etc.). The control unit 11 executes a program that performs the basic functions of the recording/reproducing apparatus 10, as well as the program(s) that performs the features of the present invention: (1) label information generating function, (2) label printing function and (3) label information recording function. Although the details of the programs will be described later, the control unit 11 realizes these functions by computing/processing data received from each unit of the recording/reproducing apparatus 10.

The printing unit 12 includes a printing mechanism 12a that performs printing, and a printing mechanism driving unit 12b that drives the printing mechanism 12a. The printing mechanism driving unit 12b acquires label information for label printing and drives the printing mechanism 12a.

The printing mechanism 12a may be any type. For example, the printing mechanism may employ either an impact printing or a non-impact printing for a print head. Further, when the printing mechanism of non-impact printing is used, printing can be performed by any of thermal transfer printing, inkjet printing and laser printing. The method for driving the print head may be a method in which the print head relatively scans the recording medium in the diametric direction and the print head is relatively moved in a direction orthogonal to the scanning direction (which is called an orthogonal coordinate scanning), or a method in which the print head relatively scans the recording medium in the radial direction and the print head is relatively moved in the circumferential direction of the recording medium (which is called an polar coordinate scanning).

The recording/reproducing unit 13 includes a recording/reproducing mechanism 13a that performs recording and reproducing, and a recording/reproducing mechanism driving unit 13b that drives the recording/reproducing mechanism 13a.

The recording/reproducing mechanism 13a mainly includes a recording medium driving mechanism and an optical pickup mechanism. The recording medium driving mechanism has a turn table (not shown) that is configured to be rotated by a spindle motor (not shown) mounted on a chassis (not shown). In a center of the turn table, a protrusion is formed that removably fits to a center aperture of the recording medium 20 and centers the recording medium 20 when the recording medium 20 is loaded on the turn table. The optical pickup mechanism includes an optical pickup and an optical pickup driving mechanism. The optical pickup mechanism moves along the information recording surface side of the recording medium 20, which is mounted on the turn table and is rotated at a predetermined speed, in the radial direction of the disk. The optical pickup mechanism, when reproducing information, for example, irradiates a laser beam onto the information recording surface of the recording medium 20, converts a detected reflected beam into an electrical signal, and generates an RF signal in an unshown head amplifier. The generated RF signal is demodulated in a signal processing circuit (not shown) of the recording/reproducing mechanism driving unit 13b.

The recording/reproducing mechanism driving unit 13b drives the recording/reproducing mechanism 13a to record a content acquired via the storage unit 14 or the external IF 15 and management information of the content into the recording medium 20. Also, the recording/reproducing mechanism driving unit 13b drives the recording/reproducing mechanism 13a to reproduce information recorded on the recording medium 20.

The storage unit 14 is, for example, a device that stores the contents acquired via the recording/reproducing unit 13 or the external IF 15 and management information of the content, and is realized by a mass storage device such as a hard disk.

The external IF 15 is a device that is connected to a communication network via a wired or wireless connection and acquires content and management information of the content from an external source, or a device that receives a broadcast and acquires a content and management information of the content. The data acquired by the external IF 15 can be recorded onto the recording medium 20 by the recording/reproducing unit 13, or can be recorded onto the storage unit 14.

In the configuration described above, the recording/reproducing apparatus 10 labels the content stored on the recording medium 20 on the recording medium 20. The control unit 11 and the printing unit 12 constitute a labeling information acquiring unit that acquires label information for indicating the content. The printing unit 12 constitutes a labeling unit that has the label information indicated on the recording medium 20. The control unit 11 constitutes a storage information acquiring unit that acquires the content before being stored on the recording medium 20. The recording/reproducing unit 13 constitutes a reproducing unit that reproduces the content that is already stored on the recording medium 20. The recording/reproducing unit 13, the storage unit 14, the external IF 15 and the like constitute a recording unit that records the label information so as to correspond to the recording medium 20.

<Operation>

In the constitution shown in FIG. 1, the control unit 11 executes a program that performs the basic functions of the recording/reproducing apparatus 10 to effect the operation of the recording/reproducing unit 13, the storage unit 14 and the external IF 15. Because how to record and reproduce information into and from the recording medium 20 or the storage unit 14 is the same as the conventional one, a detailed description thereof is omitted. In the following, a detailed description will be given of the features of the present invention: (1) label information generating function, (2) label printing function, and (3) label information recording function.

(1) Label Information Generating Function

Figure 2:
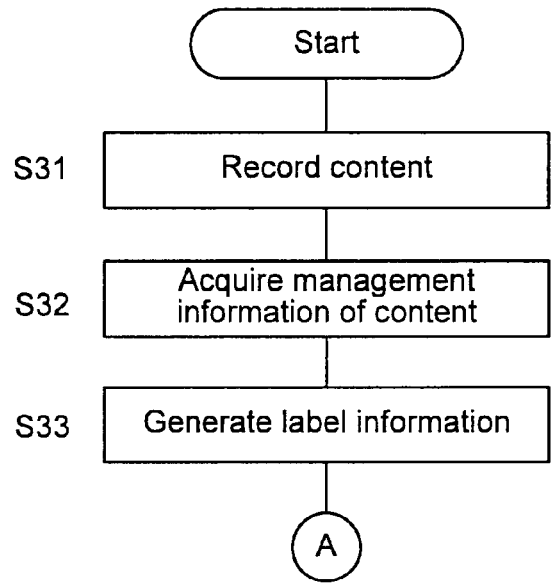
FIG. 2 it is a flowchart used to explain a label information generating function.

The function of generating label information for printing a label from content or management information of the content when the content is recorded onto the recording medium 20 will be described. The following description is based mainly on FIG. 1, and reference is made also to the flowchart of FIG. 2 where necessary.

When the user inputs a command to record a content into the recording medium 20 using an input unit or the like which is not shown in FIG. 1, the control unit 11 starts recording the content, which is stored in the storage unit 14 or acquired via the external IF 15, into the recording medium 20 (step S31). In order to simplify the description, the following describes a case where content stored in the storage unit 14 is recorded onto the recording medium 20, but it applies also to a case where the content is acquired from the external IF 15.

The control unit 11 acquires the management information of the content that is stored together with the content in the storage unit 14 (step S32). The "management information of content" refers, for example, to information containing a name (program name or the like) that describes each of the contents, a thumbnail that illustrates the content, and the like. In the case where the content is recorded onto the recording medium 20, the management information of the content refers to those recorded as a TOC (Table of Contents). In the case where the content is acquired from the external IF 15, the management information of the content may be acquired from an EPG (Electric Program Guide).

Subsequently, the control unit 11 generates label information suitable for printing from the acquired management information (step S33). This label information contains, for example, multimedia information, such as character and image information that represents management information, as well as attribute information for printing the multimedia information. The attribute information contains font information of the character information and printing position of the multimedia information. More specifically, the label information may be described in a markup language.

As long as the generated label information and the recorded content matches with each other, the generation of the label information may be performed before, during or after the content being recorded onto the recording medium 20.

(2) Label Printing Function

The function of printing a label using the label information generated by (1) label information generating function will now be described. The following description is based mainly on FIG. 1, and reference is made also to the flowchart of FIG. 3 and the diagram of FIG. 4 where necessary.

First, the control unit 11 reproduces the information from a predetermined region of the recording medium 20 to check whether or not old label information is recorded on the recording medium 20 (step S41). As used herein, the case where a label is already printed on the recording medium 20 involves such a case where old label information that is already printed on the recording medium 20, is recorded by (3) label information recording function, which will be described later.

When old label information is already recorded (see FIGS. 4A and 4A'), the control unit 11 acquires the old label information from the recording medium 20, adds the label information generated by (1) label information generating function, and generates new label information (see step S42 and FIG. 4B). Further, the control unit 11 controls the printing unit 12 to erase the old label printed on the recording medium 20 (see step S43 and FIG. 4C). The erasing is performed by, for example, filling the entire label surface with the background color (e.g., white) of the label surface. It should be understood that the erasing method is not limited to this, and it is also possible to erase the print, for example, by heating or cooling the pertinent portion of the label surface in a case where a printed state can be reversibly changed to an erased state by heating or cooling the label surface.

Then, the printing unit 12 acquires the new label information generated by the control unit 11 in step S42, and performs label printing (see step S44 and FIG. 4D).

On the other hand, as a result of determination in step S41, when old label information is not recorded, the printing unit 12 acquires the label information generated by the control unit 11 in step S33 (see FIG. 2), and performs label printing (step S44).

It is also possible to print label information that corresponds to the management information on a label. As used herein, the label information that corresponds to the management information means, for example, the size of content, reproduction time, image quality, and the like.

(3) Label Information Recording Function

Figure 4:
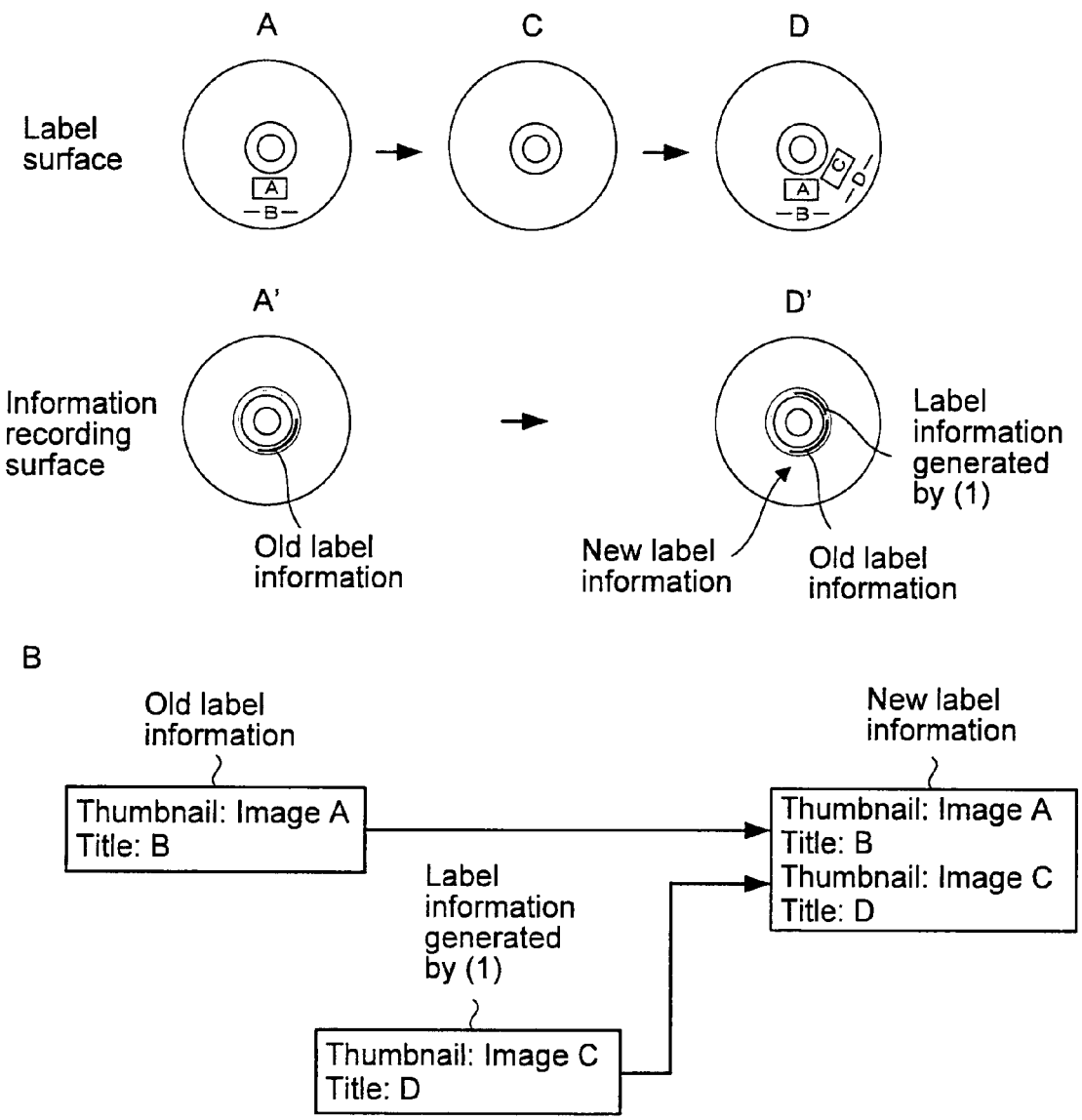
FIG. 4 it is a diagram used to explain a label printing function.
Figure 5:
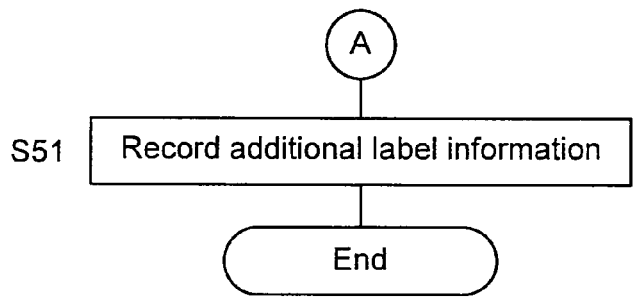
FIG. 5 it is a flowchart used to explain a label information recording function.

The function of recording the label information generated by (1) label information generating function onto the recording medium 20 will now be described. The following description is based mainly on FIG. 1, and reference is made also to the flowchart of FIG. 5 and the diagram of FIG. 4 where necessary.

The control unit 11 records the label information generated in step S33 (see FIG. 2) onto a predetermined region of the recording medium 20 (step S51). At this time, when old label information is already recorded on the recording medium 20 (see FIG. 4A'), the label information generated in step S33 is recorded to follow the old label information (see FIG. 4D').

To record the label information, the region where the old label information is recorded may be overwritten with the label information.

A specific region may be formed at the inner periphery of the disk to record the label information. The provision of the specific region allows rapid acquisition of the label information.

As long as the label information generated in step S33 is used, the process of (3) label information recording function can be performed after, before or during the process of (2) label printing function. Thereby, the label information recorded on the information recording surface of the recording medium 20 and the label information printed on the label printing surface can be matched with each other.

<Effect>

(1) As to Label Information Generating Function

The recording/reproducing apparatus 10, when recording content, generates label information from the management information of the content. This enables the recorded content and the label information to be matched.

(2) As to Label Printing Function

The recording/reproducing apparatus 10 performs label printing using the label information. The label information is generated from the management information of the content recorded on the recording medium 20. This enables the content recorded on the recording medium 20 to be matched with the label information printed on the label.

(3) As to Label Information Recording Function

The recording/reproducing apparatus 10 records the generated label information onto the recording medium 20. In other words, the generated label information is recorded so as to correspond to the recording medium 20. Thereby, it is possible to utilize label information that matches the content of the recording medium 20. For example, even when an apparatus other than the recording/reproducing apparatus 10 is used, it is possible to perform label printing by utilizing the label information recorded on the recording medium 20.

MODIFIED EXAMPLE

The above-described embodiment is merely an example of the present invention, and various modified examples can be made. Some of the modified examples will be described below.

(1) As to Label Information Generating Function (1-1)

The management information of content, which is used for generating label information, may be acquired from the recording medium 20.

More specifically, in an optical disk such as a CD and a DVD, for example, a TOC is recorded in a lead-in region. The TOC contains addresses of all the tracks included in the disk, track numbers, track times, titles, and the like. The TOC is recorded onto the lead-in region during the process for terminating the recording of content.

Upon termination of the recording of content and management information of the content onto the recording medium 20, the control unit 11 controls the recording/reproducing unit 13 to reproduce the lead-in region, and acquires the TOC as the management information of content. The control unit 11 further adds attribute information for label printing which is recorded in the TOC, generates label information, and performs label printing using the label information.

According to this modified example, label printing is performed using the management information of content that is already recorded on the recording medium 20, and this enables the content recorded on the recording medium 20 to be matched with the label information printed on the label.

Particularly when the recording medium 20 is a recording medium onto which additional information can be recorded, the TOC contains the management information of not only the newly recorded content but also the content that is already recorded, and thus the label printing can be effected with a simpler apparatus configuration or a simpler process. More specifically, when performing label printing using the label information generated using the TOC, the process in steps S41 and S42 shown in FIG. 3 may be skipped.

The generation of the label information will be described in further detail. The label information can be data expressed in a language, for example, called a "page description language" or the like. In this case, the control unit 11 acquires information recorded in the TOC such as a content title, and at the same time, sets the font for printing each title to a default font or to a font selected appropriately by the user. Further, the control unit 11 sequentially assigns the content titles to be printed onto pre-set regions. More specifically, it sequentially assigns the content titles to be printed onto a plurality of sectorial regions that are formed previously by dividing the disk in the circumferential direction. Thereby, the label information containing "Title", "Font" and "Positional information" of each of the contents is generated.

The control unit 11 analyzes the label information thus generated, and generates a print image to be label printed on the recording medium 20. This print image is supplied to the printing mechanism driving unit 12b to perform label printing.

(1-2)

In order to generate the label information, the content recorded on the recording medium 20 may be used.

Specifically, for example, when video information is recorded on the recording medium 20, the thumbnail acquired from each track may be used as label information. For example, this thumbnail may be a reduced image of an image obtained after a predetermined time elapsed from the start of each track (e.g., 30 seconds, 1 minute or 5 minutes), and may be selected automatically or manually. When the selection is performed automatically, a special image that distinguishes each track may be selected. The special image refers, for example, in the case where a sports video is recorded, to an image obtained at the time when a score is obtained, which is automatically detected by the analysis of sounds or tag information attached to the content.

Further, by subjecting the thumbnail of each track to an image process, the title of the track is extracted to generate label information.

According to this modified example, because the label information is generated based on the content recorded on the recording medium 20, the printed label information and the recorded content can be matched. Furthermore, by printing the thumbnail or the like, it is possible to print a label that can be easily recognized by the user.

(1-3)

The label information may be acquired via the storage unit 14 or the external IF 15.

In this case, in the storage unit 14 or a server connected via the external IF 15, a disk ID, that is, information specific to the recording medium 20, and the label information are stored in relation to each other.

The control unit 11 acquires the disk ID from the recording medium 20 loaded in the recording/reproducing apparatus 10, and further acquires the label information that corresponds to the disk ID via the storage unit 14 or the external IF 15. Also, in accordance with the content recorded onto the recording medium 20, the label information stored in the storage unit 14 or the external IF 15 may be updated.

According to this modified example, the label information that corresponds to the disk ID specific to the recording medium 20 can be acquired, so it is possible to acquire the label information that matches the content recorded on the recording medium 20.

Further, the label information may be stored in an IC tag provided on the recording medium 20. In this case, the recording/reproducing apparatus 10 may further include an IC tag communicating unit that acquires information stored in the IC tag and supplies the acquired information to the control unit 11.

(2) As to Label Printing Function (2-1)

Figure 3:
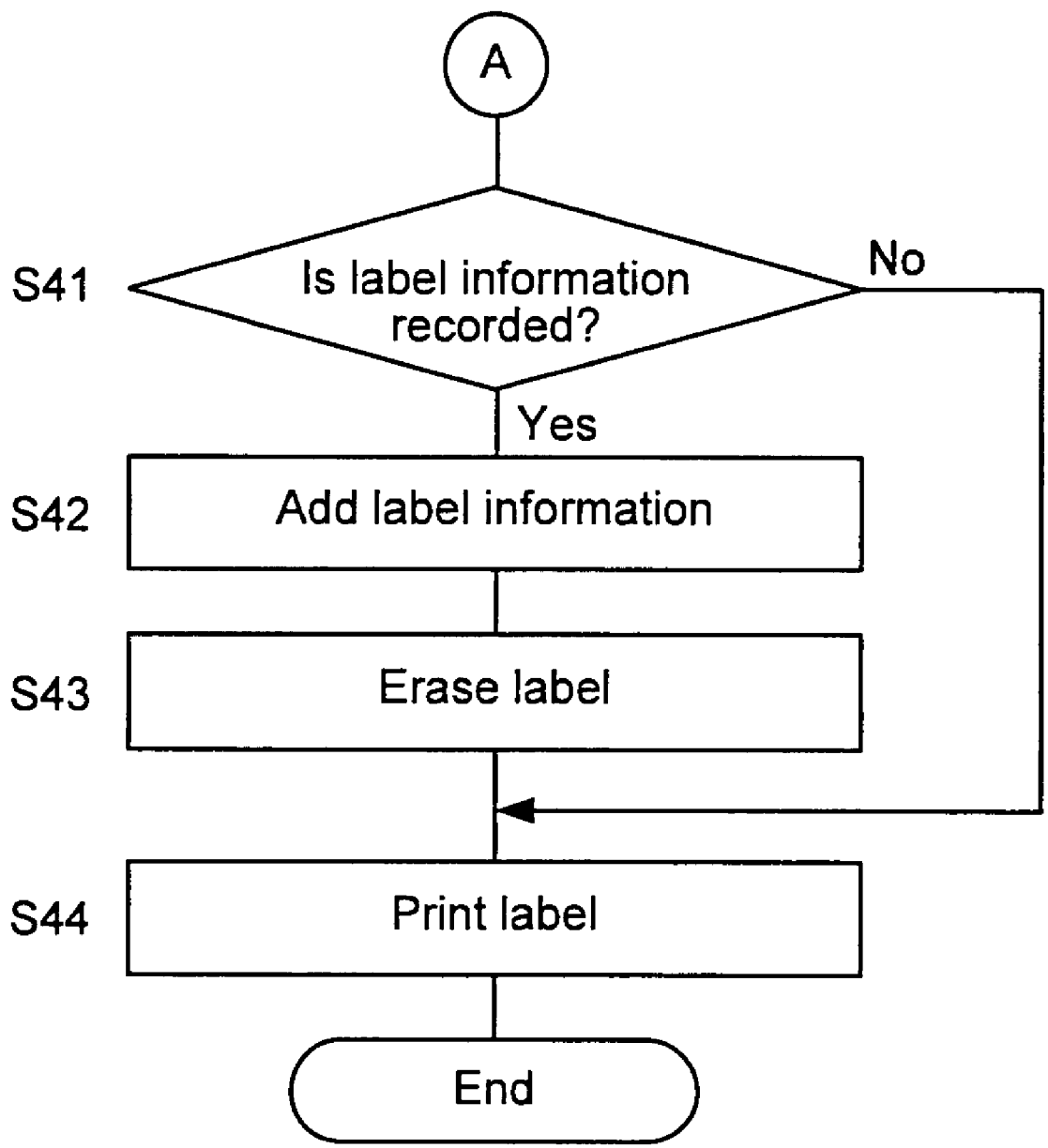
FIG. 3 it is a flowchart used to explain a label printing function.

According to the above-described embodiment, the control unit 11 erases the already printed label before performing label printing (see, for example, step S43 in FIG. 3). However, the control unit 11 may print new label information in addition to the already printed label when performing the label printing.

In this case, it is necessary to perform an adjustment such that the newly printed label does not overlap the already printed label. This adjustment requires the following units: <1> a unit for specifying the position where the label information is already printed; and <2> a unit for positioning the print head to a position where the label information is not printed.

Specifically, according to this modified example, <1> the position where label information is printed (or the position where label information is not printed) is specified based on the TOC, and <2> the print head is positioned by defining, in advance, the positional relationship between the optical pickup of the recording/reproducing mechanism 13a and the print head of the printing mechanism 12a. This will be described in further detail below.

<1> As to Specifying the Position where Label Information is Printed

The position where the label information is already printed is determined based on the TOC of the recording medium 20. This will be explained with reference to FIG. 6.

First, the control unit 11 reproduces the TOC stored in the lead-in region of the recording medium 20 before recording a content onto the recording medium 20 (FIG. 6A). Thereby, the management information of each of the contents recorded on the recording medium 20 can be acquired. For example, as shown in FIG. 6A, the titles of Content A and Content B recorded on the recording medium 20 can be acquired.

According to this modified example, the label information of each content is sequentially printed on each region (the first region 61 to the $n^{th}$ region 6n) obtained by dividing the label surface of the recording medium 20 into a plurality of regions. For example, when Content A and Content B are recorded on the recording medium 20, as shown in FIG. 6B, the labels that represent Content A and Content B are printed respectively in the regions obtained by dividing the label surface into a plurality of regions. More specifically, the first content, namely, Content A, is printed on a first region 61, and the second content, namely, Content B, is printed on a second region 62.

As described, the control unit 11 determines that the label information is printed respectively in the first region 61 and the second region 62 based on the TOC of the recording medium 20.

<2> As to Positioning of Print Head

In the state described above, another content is recorded into the recording medium 20. The control unit 11 again reproduces the TOC recorded in the lead-in region of the recording medium 20 after the content is recorded onto the recording medium 20 (FIG. 6A). For example, if the third content, namely, Content C is additionally recorded onto the recording medium 20, by reproducing the TOC, the titles and the like of Content A, Content B and Content C recorded on the recording medium 20 are acquired.

The control unit 11 compares the TOCs before and after the recording of the contents, and recognizes that Content C is newly recorded. The control unit 11 also recognizes that Content C is the third content.

Then, the control unit 11 prints the label information of Content C in a third region 63 where no label information is printed.

In the recording/reproducing apparatus 10, the relative position between the print head of the printing mechanism 12a and the optical pickup of the recording/reproducing mechanism 13a is defined. In other words, the print head and the optical pickup can be operated in synchronization with each other. Also, each position of the above-described first region 61 to the $n^{th}$ region 6n is associated with the addresses on the information recording surface or with the pits or markers for indicating arbitrarily determined positions in the information recording surface. Accordingly, by controlling the position of the optical pickup, it is possible to position the print head to the above-described first region 61 to the $n^{th}$ region 6n.

As described, the control unit 11 positions the print head onto the third region 63, and thus the label information of Content C can be printed thereon.

Modified Example 2-1

<1>

Although the first region 61 to the $n^{th}$ region 6n are regions arranged in the circumferential direction, according to this modified example, the first region 61 to the $n^{th}$ region 6n may be arranged in the radial direction.

<2>

It is also possible to perform label printing while the relative rotation phase of the recording medium 20 with respect to the recording/reproducing apparatus 10 is held constant. In this case, a pit or marker for positioning is provided on the label surface or the information recording surface of the disk, and this marker or pit allows the relative rotation phase of the recording medium 20 with respect to the recording/reproducing apparatus 10 to be constant. Thereby, it is possible to perform label printing with a simpler configuration.

Furthermore, the marker for showing a position may be realized by an IC tag provided on the recording medium 20. In this case, the recording/reproducing apparatus 10 may further include an IC tag communicating unit capable of communicating with the IC tag. The control unit 11 may determine the relative position (relative phase) between the IC tag communicating unit and the IC tag from the electric field intensity during their communication for positioning. More specifically, before the label printing, the control unit 11 may allow the recording medium 20 to rotate, and then the label printing may be performed by reference to a position (phase) where the maximum electric field intensity during communication between the communicating unit and the IC tag is obtained. It is also possible to determine the position (phase) of the recording medium 20 from the electric field intensity during communication between the IC tag communicating unit and the IC tag, and to rotate the label information (print image) according to the position (phase) and perform label printing. This IC tag may store the label information as described above.

<3>

In the above-described description, the label information does not necessarily contain the positional information, and may contain only content titles. Even in such a case, as described above, the control unit 11 recognizes an additional content by comparing the TOCs before and after the recording of the content, and determines the region onto which the additional content is to be printed.

However, the label information may be information containing the "Title", "Font" and "Positional information" of each content recorded on the recording medium 20. This will be explained with reference to FIG. 7.

FIG. 7 shows an example of label information expressed in a page description language or the like. The label information contains the "Title" of the content recorded on the recording medium 20, the "Font" for printing the title, and the "Positional information" for printing the title on the recording medium 20, and is stored in any one of storage units (the recording medium 20, the IC tag on the recording medium 20, the storage unit 14, a recording unit connected via the external IF 15), which are capable of exchanging the label information with the control unit 11.

Hereinafter, a description is given of the generation of the label information and the label printing on the assumption that the label information is stored on the recording medium 20 or the IC tag on the recording medium 20 (hereinafter referred to as a "recording medium 20 or the like").

Before a content is recorded, on the recording medium 20, Content A is assumed to be printed in a first region 61 and Content B is assumed to be printed in a second region 62 (see FIG. 6B). In this case, the label information stored on the recording medium 20 or the like is data shown in FIG. 7A. Specifically, the label information stores the "Title", "Font" and "Positional information" of each content stored on the recording medium 20.

When the recording of a new content is performed, the control unit 11 acquires its "Title" from the TOC. More specifically, the control unit 11 compares the TOC having been acquired into a work memory or the like before the recording with the TOC acquired into the work memory or the like after the recording (see FIG. 6A), and acquires the "Title" of the newly recorded content. With this process, the Title "C" of Content C is acquired as shown in FIG. 7B.

Subsequently, the "Font" for printing the "Title" is set to a default font or a font selected appropriately by the user. Here, the font "F1" is assumed to be selected.

The control unit 11 acquires the already stored label information (see FIG. 7A) from the recording medium 20 or the like. Specifically, the control unit 11 acquires the "Positional information" of the already stored Content A and Content B. The control unit 11 then selects, based on the acquired "Positional information", a vacant region (a region in which no print exists) in the first region 61 to the $n^{th}$ region 6n on the recording medium 20. For example, the control unit 11 selects a region having a number obtained by adding 1 to the largest of the numbers representing the "positional information" that are already stored ("61" and "62" in the case of FIG. 7A), and assigns the obtained number as the "Positional information" of the region onto which the label of new Content C will be printed. With this process, the positional information "63" of Content C shown in FIG. 7B is selected.

In the above manner, as the label information of new Content C, the title, font and positional information thereof are determined to be "C", "F1" and "63", respectively, and this label information serves as label information for label printing.

The control unit 11 drives the printing mechanism driving unit 12b using this label information for label printing, and prints the title "C" of Content C on the "Third region 63" using a font "F1".

Further, the control unit 11 generates label information after printing. Specifically, by adding the generated label information for printing (see FIG. 7B) to the already stored label information (see FIG. 7A), label information after printing (FIG. 7C) is generated. Furthermore, the control unit 11 stores the generated label information after printing onto the storage medium 20 or the like.

<4>

When deleting content, it is preferable that the region where the label information of the content is printed is marked out or another graphic is printed so as to be overlapped on the label information so that the deletion is recognizable. For example, as shown in FIGS. 8A to B, when Content C is additionally recorded and Content A is deleted, it is preferable to mark out the label information of Content A having been printed in the first region 61 with a cancellation line. As long as the old label information remains with a cancellation line, even if the user inadvertently deletes certain data from the recording medium, the user can restore the data based on the old label information indicated with a cancellation line if the label information and the content information are stored so as to be related to each other in the storage unit such as a hard disk.

In such a case, the label information may be information containing the "Title", "Font" and "Positional information" of each content recorded in the recording medium 20 as described in <3>. This will be explained with reference to FIG. 9.

Figures 9, 10, 11:
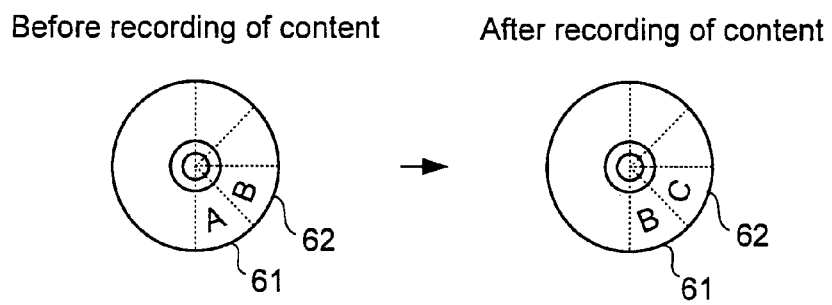
FIG. 9 it is a diagram used to explain label information.
FIG. 10 it is a diagram used to explain a label printing function according to a modified example.
FIG. 11 it is a diagram used to explain label information.

FIG. 9 shows an example of label information expressed in a page description language or the like.

Before recording a content on the recording medium 20, Content A is assumed to be printed in a first region 61 and Content B is assumed to be printed in a second region 62 (see FIG. 8B). In this case, the label information stored on the recording medium 20 or the like is data shown in FIG. 9A. Specifically, the label information stores the "Title", "Font" and "Positional information" of each of the contents.

When deleting content, the control unit 11 acquires the "Title" of the content for deletion from the TOC. More specifically, the control unit 11 compares the TOC having been acquired into a work memory or the like before deletion and the TOC stored in the work memory or the like after deletion, and acquires the "Title" of the content that is contained in the TOC before deletion but is not contained in the TOC after deletion.

Subsequently, the control unit 11 acquires the already stored label information (see FIG. 9A) from the recording medium 20 or the like. At this time, the control unit 11 stores only the label information of the deleted content into the work memory from the acquired label information.

The control unit 11 then replaces the "Title" item of the label information stored in the work memory with a sign that indicates that the title has been deleted. For example, the control unit 11 replaces the title item with a sign such as a "cancellation line" as shown by "=" in FIG. 9B. Thereby, the control unit 11 generates the label information for label printing of the deleted content. In other words, as the label information of the deleted Content A, the title, font and positional information thereof are determined to be "cancellation line", "F1" and "61", respectively.

Although new Content C is recorded in FIG. 8A, the generation of the label information for label printing of this new Content C is described in <3>, and thus a description thereof is omitted.

With the above-described process, the control unit 11 generates the label information for label printing of the deleted content and of the newly recorded content (see FIG. 9B).

The control unit 11 drives the printing mechanism driving unit 12b using this label information for label printing, and prints the "cancellation line" in the "First region 61" using a font "F1" such that the "cancellation line" is printed over the title "A" of the Content A that has already been printed in the first region 61. The control unit 11 prints also the title "C" of Content C in the "Third region 63" using a font "F1".

Further, the control unit 11 generates label information after printing. Specifically, by adding the generated label information for printing (see FIG. 9B) to the already stored label information (see FIG. 9A), label information after printing (FIG. 9C) is generated. The generated label information is stored on the storage medium 20 or the like. At this time, as the label information after printing of the deleted Content A, information containing the title "A" of Content A with the "cancellation line" thereon is stored in the "title" item.

<5>

When rewriting the label, it is also possible to perform label printing such that the existing printed label is overwritten. For example, as shown in FIG. 8A, when Content C is additionally recorded and Content A is deleted, as shown in FIG. 10, the label information of Content A and Content B printed in the first region 61 and the second region 62 can be overwritten with the label information of Content B and Content C.

In such a case, the label information may be information containing the "Title", "Font" and "Positional information" of each content recorded on the recording medium 20 as described in <3>. This will be explained with reference to FIG. 11.

FIG. 11 shows an example of label information expressed in a page description language or the like.

Before recording a content on the recording medium 20, Content A is assumed to be printed in a first region 61 and Content B is assumed to be printed in a second region 62 (see FIG. 10). In this case, the label information stored on the recording medium 20 or the like is data shown in FIG. 11A. Specifically, the label information stores the "Title", "Font" and "Positional information" of each of the contents.

The control unit 11 stores the TOC in a work memory before recording and deletion (hereinafter referred to as a "recording and the like") of a content as well as after the recording and the like. The control unit 11 acquires "Title" serving as label information for printing from the TOC acquired after the recording and the like. Specifically, as shown in FIG. 8A, because Content B and Content C are recorded after the recording and the like, the control unit 11 acquires the titles "B" and "C" from the TOC.

Further, the control unit 11 sets the "Font" for printing the "Titles" to a default font or to a font selected appropriately by the user. Here, a font "F1" is assumed to be selected for all the "Titles."

Furthermore, the control unit 11 acquires the "Positional information" of the region(s) in which a print already exists from the label information (see FIG. 11A) stored on the storage medium 20 or the like. The control unit 11 then sequentially assigns the "Titles" acquired from the TOC to the regions shown by the acquired "Positional information". This assignment is performed such that the region in which a print already exists is overwritten with the "Title" of the content recorded after recording and the like.

At this time, when the number of recorded contents before and after recording and the like is the same, all the "Title" items of the regions in which prints already exist are substituted with new "Titles". On the other hand, when the number of recorded contents after recording and the like is less than that before recording and the like, the "Title" items of some of the regions in which prints already exist are substituted with new "Titles", and the "Title" item of the remaining region of the regions in which a print already exists is substituted with a sign that indicates that the print of the region will be erased (e.g., a sign indicating that the "Background color" of the recording medium 20 will be overwritten by printing). Conversely, when the number of recorded contents after recording and the like is greater than that before recording and the like, the "Title" items of all the regions in which prints already exist are substituted with new "Titles", and vacant regions except the regions in which prints already exist are assigned to the remaining new "Titles". In this case, the assignment of vacant regions is performed beginning from a region having a smaller number, which represents "Positional information" of the vacant region.

In an example shown in FIG. 10, because the number of contents before and after recording and the like is the same, the control unit 11 sequentially assigns new titles "B" and "C" to the regions in which prints already exist (the first region 61 and the second region 62).

In the above-described manner, the label information for printing is generated (see FIG. 11B).

The control unit 11 drives the printing mechanism driving unit 12*b* using this label information for label printing, and prints the title "B" of Content B on the "First region 61" using a font "F1", and the title "C" of Content C on the "Second region 62" using a font "F1".

Further, the control unit 11 generates label information after printing. Specifically, by deleting data stored in "Title" from the label information for label printing, label information after printing is generated. In the example shown in FIG. 11, the label information for label printing matches the label information after printing. The generated label information is stored on the storage medium 20 or the like.

<6>

<1> In order to specify the position where the label information is printed, the label surface may be read by a scanner to process. Specifically, the control unit 11 performs an OCR (Optical Character Reader) process on the label surface read by a scanner, and detects the position of the character information and image information. Further, it may allow the printing unit 12 to perform label printing on the position where no character information or image information is printed. In this case, an image of the label surface read by the scanner may be displayed in a display apparatus such as a monitor, and the user may set the printing position of the new label information.

(2-2)

Although the embodiment given above described the label indicating carried out by the label printing, it is also possible to indicate the label information on the information recording surface so as to be visible.

In the recording medium 20, when information is recorded, the physical property of the information recording surface changes by the irradiation of laser beam, and a significant number of pits are formed. Accordingly, the portion where information is recorded and the portion where information is not recorded can be identified, so the label information can be indicated in a radius region where no content is recorded so as to be visible.

According to this modified example, the provision of the printing unit 12 for label indicating is unnecessary, so it is possible to perform the label indicating with a simpler constitution.

(2-3)

According to the above-described embodiment, in step S41, it is determined whether or not the label information is recorded on the recording medium 20. But it may be determined whether or not the label information is recorded in the storage unit 14, a server connected via the external IF 15 or the like.

In this case, the ID (disk ID) specific to the recording medium 20 and the label information are recorded in relation to each other in the storage unit 14 or a server connected via the external IF 15.

For example, when the label information is printed, the label information that is related to the disk ID of the recording medium 20 is acquired from the storage unit 14, a server connected via the external IF 15 or the like.

Thereby, it is possible to utilize label information that matches the content recorded in the recording medium 20 without forming a region for recording the label information on the recording medium 20.

(3) As to Label Information Recording Function (3-1)

Although the embodiment given above described that the label information generated by the label information generating function is recorded onto the recording medium 20, the label information may be recorded into the storage unit 14, a server connected via the external IF 15 or the like.

In this case, the ID (disk ID) specific to the recording medium 20 and the label information are recorded in relation to each other.

(4) Others (4-1)

According to the above-described embodiment, the recording medium 20 is mainly an optical disk such as a CD or DVD. However, the recording medium 20 may be other recording medium such as a FD, PD or MO. Particularly, in the case of a recording medium housed in a cartridge, the printing may be performed on the label surface of the cartridge.

(4-2)

The recording/reproducing apparatus 10 does not necessarily have all the functions described in the above embodiment: (1) the label information generating function, (2) the label printing function and (3) the label information recording function. The recording/reproducing apparatus 10 may be an apparatus that realizes only any one of the functions.

The labeling method, recording method, labeling apparatus, recording apparatus and recording medium according to the present invention are useful in the field required to perform labeling that matches the information recorded in a recording medium.

The invention claimed is:

1. A labeling method for labeling labeling information on a recording medium, the labeling information being for indicating information which is related to information adapted to be stored on the recording medium as storage information, the labeling method comprising:
    a labeling information acquiring step of acquiring first labeling information corresponding to first storage information;
    a positional information acquiring step of acquiring positional information relating to a position on the recording medium where second labeling information corresponding to second storage information different from the first storage information is labeled;
    a labeling position specifying step of specifying a labeling position on the recording medium, where the first labeling information is to be labeled, based on the positional information; and
    a labeling step of labeling the first labeling information on the specified labeling position of the recording medium,
    wherein the second storage information is deleted from the recording medium, the second labeling information including information indicating the deletion, and
    the labeling position differs from a position of the positional information.

2. The labeling method according to claim 1, wherein the labeling step includes printing the first labeling information on the recording medium.

3. The labeling method according to claim 1, wherein the labeling information acquiring step includes generating the first labeling information based on the first storage information.

4. The labeling method according to claim 3, further comprising:
    a storage information acquiring step of acquiring the first storage information that is being stored on the recording medium or the first storage information before being stored on the recording medium,
    wherein the labeling information acquiring step includes generating the first labeling information based on the acquired first storage information.

5. The labeling method according to claim 3, further comprising:
    a reproducing step of reproducing the first storage information that is already stored on the recording medium,
    wherein the labeling information acquiring step includes generating the first labeling information based on the reproduced first storage information.

6. The labeling method according to claim 1,
    wherein the second storage information is recorded on the recording medium; and
    the labeling position differs from a position of the positional information.

7. A recording method for recording labeling information on a recording medium, the labeling information being for indicating information which is related to information adapted to be stored on the recording medium as storage information, the recording method comprising:
    a labeling information acquiring step of acquiring first labeling information corresponding to first storage information;
    a positional information acquiring step of acquiring positional information relating to a position on the recording medium where second labeling information corresponding to second storage information different from the first storage information is labeled;
    a labeling position specifying step of specifying a labeling position on the recording medium, where the first labeling information is to be labeled, based on the positional information; and
    a recording step of recording the first labeling information and information relating to the specified labeling position,
    wherein the second storage information is deleted from the recording medium, the second labeling information including information indicating the deletion, and
    the labeling position differs from a position of the positional information.

8. The recording method according to claim 7,
    wherein the first labeling information is information for printing the first storage information on the recording medium.

9. The recording method according to claim 7,
    wherein the recording step includes recording the first labeling information on an information recording surface of the recording medium.

10. The recording method according to claim 7,
    wherein the recording step includes recording the first labeling information together with information for specifying the recording medium.

11. The recording method according to claim 7,
    wherein the first labeling information recorded in the recording step is changeable according to a change in the first storage information.

12. The recording method according to claim 7,
    wherein the second storage information is recorded on the recording medium; and
    the labeling position differs from a position of the positional information.

13. A labeling apparatus that labeling information on a recording medium, the labeling information being for indicating information which is related to information adapted to be stored on the recording medium as storage information, the labeling apparatus comprising:
    a labeling information acquiring unit for acquiring first labeling information corresponding to first storage information;
    a positional information acquiring unit of acquiring positional information relating to a position on the recording medium where second labeling information corresponding to second storage information different from the first storage information is labeled;
    a labeling position specifying step of specifying a labeling position on the recording medium, where the first labeling information is to be labeled, based on the positional information; and
    a labeling unit for labeling the first labeling information on the specified labeling position of the recording medium, wherein the second storage information is deleted from the recording medium, the second labeling information including information indicating the deletion, and the labeling position differs from a position of the positional information.

14. The labeling apparatus according to claim 13, wherein the labeling unit prints the first labeling information on the recording medium.

15. The labeling apparatus according to claim 13, wherein the labeling information acquiring unit generates the first labeling information based on the first storage information.

16. The labeling apparatus according to claim 15, further comprising:

a storage information acquiring unit for acquiring the first storage information that is being stored on the recording medium or the first storage information before being stored on the recording medium, wherein the labeling information acquiring unit generates the first labeling information based on the acquired first storage information.

17. The labeling apparatus according to claim 15, further comprising:

a reproducing unit for reproducing the first storage information that is already stored on the recording medium, wherein the labeling information acquiring unit generates the first labeling information based on the reproduced first storage information.

18. The labeling apparatus according to claim 13, wherein the second storage information is recorded on the recording medium; and the labeling position differs from a position of the positional information.

19. A recording apparatus that records labeling information for indicating information on a recording medium, the information being related to information adapted to be stored on the recording medium as storage information, the recording apparatus comprising:

a labeling information acquiring unit for acquiring first labeling information corresponding to first storage information;

a positional information acquiring unit for acquiring positional information relating to a position on the recording medium where second labeling information corresponding to second storage information different from the first storage information is labeled;

a labeling position specifying unit for specifying a labeling position on the recording medium, where the first labeling information is to be labeled, based on the positional information; and a recording unit for recording the first labeling information and information relating to the specified labeling position, wherein the second storage information is deleted from the recording medium, the second labeling information including information indicating the deletion, and the labeling position differs from a position of the positional information.

20. The recording apparatus according to claim 19, wherein the first labeling information is information for printing the first storage information on the recording medium.

21. The recording apparatus according to claim 19, wherein the recording unit records the first labeling information on an information recording surface of the recording medium.

22. The recording apparatus according to claim 19, wherein the recording unit records the first labeling information together with information for specifying the recording medium.

23. The recording apparatus according to claim 19, wherein the first labeling information recorded by the recording unit is changeable according to a change in the first storage information.

24. The recording apparatus according to claim 19, wherein the second storage information is recorded on the recording medium; and the labeling position differs from a position of the positional information.

25. An optical disk on which information stored therein as storage information can be labeled, the optical disk comprising:

a first region for recording the storage information;

a second region for recording labeling information for indicating information relating to the storage information; and a third region for labeling the labeling information, wherein the second region includes a fourth region for recording positional information relating to a labeling position on the optical disk where the labeling information is to be labeled.

26. The optical disk according to claim 25, wherein the labeling information is changeable according to a change in the storage information.

27. A labeling method for labeling information on a recording medium, the labeling information being for indicating information which is related to information adapted to be stored on the recording medium as storage information, the labeling method comprising:

a labeling information acquiring step of acquiring first labeling information corresponding to first storage information;

a positional information acquiring step of acquiring positional information relating to a position on the recording medium where second labeling information corresponding to second storage information different from the first storage information is labeled;

a labeling position specifying step of specifying a labeling position on the recording medium, where the first labeling information is to be labeled, based on the positional information; and a labeling step of labeling the first labeling information on the specified labeling position of the recording medium, wherein the second storage information is deleted from the recording medium, and the labeling information including the second labeling information is updated to the labeling information including the first labeling information.

28. The labeling method according to claim 27, wherein the labeling step includes printing the first labeling information on the recording medium.

29. The labeling method according to claim 27, wherein the labeling information acquiring step includes generating the first labeling information based on the first storage information.

30. The labeling method according to claim 29, further comprising:

a storage information acquiring step of acquiring the first storage information that is being stored on the recording medium or the first storage information before being stored on the recording medium, wherein the labeling information acquiring step includes generating the first labeling information based on the acquired first storage information.

31. The labeling method according to claim 29, further comprising:
a reproducing step of reproducing the first storage information that is already stored on the recording medium,
wherein the labeling information acquiring step includes generating the first labeling information based on the reproduced first storage information.

32. A recording method for recording labeling information on a recording medium, the labeling information being for indicating information which is related to information adapted to be stored on the recording medium as storage information, the recording method comprising:
a labeling information acquiring step of acquiring first labeling information corresponding to first storage information;
a positional information acquiring step of acquiring positional information relating to a position on the recording medium where second labeling information corresponding to second storage information different from the first storage information is labeled;
a labeling position specifying step of specifying a labeling position on the recording medium, where the first labeling information is to be labeled, based on the positional information; and
a recording step of recording the first labeling information and information relating to the specified labeling position,
wherein the second storage information is deleted from the recording medium, and
the labeling information including the second labeling information is updated to the labeling information including the first labeling information.

33. The recording method according to claim 32,
wherein the first labeling information is information for printing the first storage information on the recording medium.

34. The recording method according to claim 32,
wherein the recording step includes recording the first labeling information on an information recording surface of the recording medium.

35. The recording method according to claim 32,
wherein the recording step includes recording the first labeling information together with information for specifying the recording medium.

36. The recording method according to claim 32,
wherein the first labeling information recorded in the recording step is changeable according to a change in the first storage information.

37. A labeling apparatus that labels labeling information on a recording medium, the labeling information being for indicating information which is related to information adapted to be stored on the recording medium as storage information, the labeling apparatus comprising:
a labeling information acquiring unit for acquiring first labeling information corresponding to first storage information;
a positional information acquiring unit for acquiring positional information relating to a position on the recording medium where second labeling information corresponding to second storage information different from the first storage information is labeled;
a labeling position specifying unit for specifying a labeling position on the recording medium, where the first labeling information is to be labeled, based on the positional information; and
a labeling unit for labeling the first labeling information on the specified labeling position of the recording medium,
wherein the second storage information is deleted from the recording medium, and
the labeling information including the second labeling information is updated to the labeling information including the first labeling information.

38. The labeling apparatus according to claim 37,
wherein the labeling unit prints the first labeling information on the recording medium.

39. The labeling apparatus according to claim 37,
wherein the labeling information acquiring unit generates the first labeling information based on the first storage information.

40. The labeling apparatus according to claim 39, further comprising:
a storage information acquiring unit for acquiring the first storage information that is being stored on the recording medium or the first storage information before being stored on the recording medium,
wherein the labeling information acquiring unit generates the first labeling information based on the acquired first storage information.

41. The labeling apparatus according to claim 39, further comprising:
a reproducing unit for reproducing the first storage information that is already stored on the recording medium,
wherein the labeling information acquiring unit generates the first labeling information based on the reproduced first storage information.

42. A recording apparatus that records labeling information for indicating information on a recording medium which is related to information adapted to be stored on the recording medium as storage information, the recording apparatus comprising:
a labeling information acquiring unit for acquiring first labeling information corresponding to first storage information;
a positional information acquiring unit for acquiring positional information relating to a position on the recording medium where second labeling information corresponding to second storage information different from the first storage information is labeled;
a labeling position specifying unit for specifying a labeling position on the recording medium, where the first labeling information is to be labeled, based on the positional information; and
a recording unit for recording the first labeling information and information relating to the specified labeling position,
wherein the second storage information is deleted from the recording medium, and
the labeling information including the second labeling information is updated to the labeling information including the first labeling information.

43. The recording apparatus according to claim 42,
wherein the first labeling information is information for printing the first storage information on the recording medium.

44. The recording apparatus according to claim 42,
wherein the recording unit records the first labeling information on an information recording surface of the recording medium.

45. The recording apparatus according to claim 42,
wherein the recording unit records the first labeling information together with information for specifying the recording medium.

46. The recording apparatus according to claim 42,
wherein the first labeling information recorded by the recording unit is changeable according to a change in the first storage information.

* * * * *